United States Patent
Dai et al.

(10) Patent No.: US 10,217,975 B2
(45) Date of Patent: Feb. 26, 2019

(54) PACKAGING MATERIAL FOR POWER STORAGE DEVICE AND POWER STORAGE

(71) Applicant: TOPPAN PRINTING CO., LTD., Tokyo (JP)

(72) Inventors: Hiroshi Dai, Tokyo (JP); Yuki Muroi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 42 days.

(21) Appl. No.: 15/336,054

(22) Filed: Oct. 27, 2016

(65) Prior Publication Data
US 2017/0047561 A1    Feb. 16, 2017

Related U.S. Application Data

(63) Continuation of application No. PCT/JP2015/079273, filed on Oct. 16, 2015.

(30) Foreign Application Priority Data

Oct. 16, 2014  (JP) .................................. 2014-211533
Mar. 17, 2015  (JP) .................................. 2015-053396

(51) Int. Cl.
*H01M 2/02*  (2006.01)
*H01M 2/08*  (2006.01)
(Continued)

(52) U.S. Cl.
CPC ........... *H01M 2/0292* (2013.01); *B32B 15/00* (2013.01); *B32B 15/08* (2013.01); *B32B 15/085* (2013.01);
(Continued)

(58) Field of Classification Search
CPC ....... B32B 15/00; B32B 15/08; B32B 15/085; B32B 27/08; B32B 27/32; B32B 15/20;
(Continued)

(56) References Cited

U.S. PATENT DOCUMENTS

| 2002/0160212 | A1* | 10/2002 | Yamashita | ................ B32B 7/12 428/458 |
| 2008/0058449 | A1* | 3/2008 | Tonge | ..................... C08L 27/12 524/170 |
| 2014/0242333 | A1* | 8/2014 | Oono | .................... B32B 15/095 428/141 |

FOREIGN PATENT DOCUMENTS

| EP | 1 209 094 A1 | 5/2002 |
| EP | 2 779 266 A1 | 9/2014 |

(Continued)

OTHER PUBLICATIONS

International Search Report issued in International Patent Application No. PCT/JP2015/079273 dated Jan. 12, 2016.
(Continued)

*Primary Examiner* — Muhammad S Siddiquee
(74) *Attorney, Agent, or Firm* — Foley & Lardner LLP

(57) ABSTRACT

A packaging material for a power storage device, the packaging material including, in order from a first surface of a metal foil, a first corrosion protection layer and a coating layer, and, in order from a second surface of the metal foil, a second corrosion protection layer, an adhesive layer, and a sealant layer. In the packaging material, the coating layer contains at least one selected from a group consisting of fluorine resins and amorphous polyester resins.

10 Claims, 1 Drawing Sheet

(51) Int. Cl.
  *B32B 15/08*   (2006.01)
  *B32B 15/00*   (2006.01)
  *B32B 15/085*  (2006.01)
  *B32B 27/08*   (2006.01)
  *B32B 15/20*   (2006.01)
  *B32B 27/32*   (2006.01)
  *H01G 11/80*   (2013.01)

(52) U.S. Cl.
  CPC .............. *B32B 15/20* (2013.01); *B32B 27/08* (2013.01); *B32B 27/32* (2013.01); *H01G 11/80* (2013.01); *H01M 2/0277* (2013.01); *H01M 2/0285* (2013.01); *H01M 2/0287* (2013.01); *H01M 2/08* (2013.01); *B32B 2255/20* (2013.01); *B32B 2307/31* (2013.01); *B32B 2457/10* (2013.01); *B32B 2553/00* (2013.01)

(58) Field of Classification Search
  CPC ............ B32B 2255/20; B32B 2307/31; B32B 2553/00; B32B 2457/10; H01M 2/0277; H01M 2/0285; H01M 2/0292; H01M 2/0287; H01M 2/08; H01G 11/80
  See application file for complete search history.

(56) References Cited

FOREIGN PATENT DOCUMENTS

| JP | 3567230 B2 | 9/2004 |
| JP | 2014-007131 A | 1/2014 |
| WO | WO-2015/163371 A1 | 10/2015 |

OTHER PUBLICATIONS

Extended European Search Report issued in Application No. 15851262.4 dated Nov. 17, 2016.

* cited by examiner

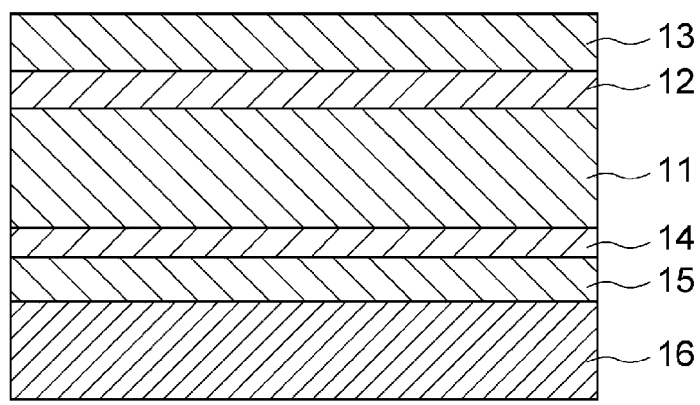

PACKAGING MATERIAL FOR POWER STORAGE DEVICE AND POWER STORAGE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/079273 filed on Oct. 16, 2015, which is based upon and claims the benefit of priority of Japanese Patent Application No. 2014-211533, filed on Oct. 16, 2014, and Japanese Patent Application No. 2015-053396, filed on Mar. 17, 2015, the entire contents of them all are hereby incorporated by reference.

TECHNICAL FIELD

The present invention relates to a packaging material for a power storage device, and a power storage device which uses the packaging material.

BACKGROUND

It is known that nickel hydride storage batteries and lead storage batteries are used as power storage devices, such as secondary batteries. The downsizing of secondary batteries, however, is required in many cases because of the downsizing of mobile devices, limitations of installation space, etc. Accordingly, attention is being paid to a lithium-ion battery having high energy density. As a packaging material (hereinafter may also be referred to simply as the "packaging material") which can be used in a lithium ion battery, although a metallic can has been widely used conventionally, a multilayer film has come to be used more and more that is lighter, has higher radiation performance and can be made at a lower cost.

An electrolytic solution of a lithium ion battery is composed of an aprotic solvent such as propylene carbonate, ethylene carbonate, dimethyl carbonate, diethyl carbonate or ethylmethyl carbonate, and an electrolyte. A lithium salt such as $LiPF_6$ or $LiBF_4$ is used as the electrolyte. However, these lithium salts generate hydrofluoric acid due to a hydrolysis reaction with water. Hydrofluoric acid causes corrosion on the metallic surface of battery members and causes a decrease of the laminate bond strength between layers of the packaging material formed of the multilayer film.

Accordingly, a barrier layer formed of a metal foil such as an aluminum foil is provided inside a packaging material formed of a multilayer film in order to prevent water from entering through the surface of the multilayer film. For example, there is known a packaging material wherein: a base layer having heat-resistance/a first adhesive layer/a barrier layer/a corrosion protection layer which prevents corrosion due to hydrofluoric acid/a second adhesive layer/a sealant layer are sequentially layered. The lithium-ion battery which uses the above-described packaging material is also referred to as an aluminum laminate type lithium-ion battery.

As one type of an aluminum laminate type lithium-ion battery, there is known a battery in which a recess is formed on a part of the packaging material by cold forming, the battery contents such as a positive electrode, a separator, a negative electrode, an electrolytic solution, etc., are accommodated in the recess, and the remaining portions of the packaging material are folded and the edge portions are sealed by heat-sealing. Such a battery is also referred to as an embossed type lithium ion battery. Recently, for the purpose of increasing the energy density, an embossed type lithium-ion battery where recesses are formed on both sides of the packaging materials to be bonded together has been produced. This type of lithium-ion battery can accommodate more battery contents.

The energy density of the lithium-ion battery increases as the depth of the recess formed by cold forming increases. However, pinholes or breaking can more readily occur during forming of the packaging material as the formed recess becomes deeper. Accordingly, a stretched film is used for the base layer of the packaging material to protect the barrier layer (metal foil). As stated above, normally, the base layer is joined with the barrier layer via an adhesive layer (for example, refer to PTL 1).

CITATION LIST

Patent Literature

PTL 1: JP-B-3567230

SUMMARY OF THE INVENTION

Technical Problem

PTL 1 uses a stretched polyamide film or a stretched polyester film having a tensile strength and an elongation amount set to a prescribed value or more as the base layer in order to improve the formability. However, when a stretched polyamide film is used, there is a problem that the stretched polyamide film melts when the electrolyte adheres to the stretched polyamide film during the electrolyte injection step, etc. Further, when a stretched polyester film is used, there is a problem that the toughness decreases, thus the formability is deteriorated.

Taking the aforementioned circumstances into consideration, it is the object of the present invention to provide a packaging material for a power storage device which can maintain a sufficient formability, and has electrolytic resistance with which the packaging material is hardly deteriorated if in contact with the electrolyte, as well as very good heat resistance, and to provide a power storage device which uses the packaging material.

The present invention provides a packaging material for a power storage device including, in order from a first surface of a metal foil, a first corrosion protection layer and a coating layer, and, in order from a second surface of the metal foil, a second corrosion protection layer, an adhesive layer, and a sealant layer. In the packaging material, the coating layer contains at least one selected from a group consisting of fluorine resins and amorphous polyester resins.

The packaging material of the present invention can maintain sufficient formability, and can have electrolytic resistance which is not altered if in contact with the electrolyte, and improved and even very good heat resistance. Further, the packaging material of the present invention can omit the adhesive layer which has been used when adhering a conventional stretched film to a barrier layer, and realize reduction in cost and reduction of thickness.

In the present invention, the thickness of the coating layer is preferably in a range of 3 to 30 μm. The electrolytic resistance and the formability are easily maintained thereby.

Further, in the present invention, it is preferable that the fluorine resins are tetrafluro type fluororesins, and the amorphous polyester resins are solvent-soluble polyesters. The electrolytic resistance is more easily improved thereby.

In the present invention, it is preferable that the fluorine resins and the amorphous polyester resins are cured with isocyanate. The heat resistance of the coating layer is easily improved thereby, and a cross-linking structure becomes dense, thus, the film strength of the coating layer increases, and a better formability can be maintained.

It is preferable that the aforementioned isocyanate includes tolylene diisocyanate. The advantageous effects can be further obtained more easily using the aforementioned diisocyanate.

In the present invention, a coefficient of static friction between surfaces of the coating layer is preferably in a range of 0.10 to 0.60, a surface of the coating layer being in contact with the first corrosion protection layer. It is easy to maintain much better formability thereby.

In the present invention, it is preferable that the coating layer further contains at least one additive selected from a group consisting of fluorine additives and silicone additives. Such a configuration can realize a better formability.

In the present invention, the fluorine additives are preferably polytetrafluoroethylenes or perfluoropolyethers, and the silicone additives are preferably alkyl-modified silicones or polyether-modified silicones. Such a configuration can realize better formability without deterioration of the heat resistance and the electrolytic resistance.

In the present invention, it is preferable that the content of the additive is in a range of 0.05 to 1.00 mass %. Such a configuration can easily obtain the effect of using additives.

The present invention further provides a power storage device which has a container formed from the packaging material for the power storage device described above so that the sealant layer is located on the inside. The power storage device obtained using the aforementioned packaging material can provide sufficient formability, electrolytic resistance, and improved and even very good heat resistance.

Advantageous Effects of the Invention

The present invention can provide a packaging material for a power storage device, which can maintain sufficient formability, can have electrolytic resistance which is not altered if in contact with the electrolyte, and good heat resistance, and can provide a power storage device which uses this packaging material. The adhesive layer which has been used when adhering a conventional stretched film to a barrier layer is not necessarily needed in the present invention, thus, it is possible to realize cost reduction and thickness reduction.

BRIEF DESCRIPTION OF THE DRAWINGS

FIG. 1 is a cross-sectional view illustrating a packaging material for a power storage device according to an embodiment of the present invention.

DESCRIPTION OF REPRESENTATIVE EMBODIMENTS

<Packaging Material for Power Storage Device>

With reference to FIG. 1, a representative embodiment of the present invention will be described. However, it is noted that the invention is not limited to this embodiment. FIG. 1 is a cross-sectional view illustrating a packaging material for a power storage device (hereinafter, referred to simply as the "packaging material") 1 of the present embodiment.

The packaging material of the present embodiment includes a first corrosion protection layer and a coating layer which are disposed in this order on a first surface of a metal foil, and a second corrosion protection layer, an adhesive layer, and a sealant layer which are disposed in this order on a second surface of the metal foil. Namely, as shown in FIG. 1, the packaging material 1 includes a metal foil 11 which exhibits a barrier function, a first corrosion protection layer 12 and a coating layer 13 formed in sequence on a first surface (in FIG. 1, the upper surface) of the metal foil 11, a second corrosion protection layer 14 formed on a second surface (in FIG. 1, the lower surface) of the metal foil 11, and an adhesive layer 15 and a sealant layer 16 formed in sequence on the second corrosion protection layer 14. When using the packaging material 1 to form a power storage device, the coating layer 13 is the outermost layer and the sealant layer 16 is the innermost layer.

[Metal Foil]

As the metal foil 11, various metal foils such as aluminum, stainless steel, copper, nickel, etc., can be used, and among these, an aluminum foil is preferable from the viewpoints of a moisture-proof property, processability such as ductility, and cost, and a copper foil or a nickel foil is preferable in view of the rigidity. As the aluminum foil, ordinary soft aluminum foils can be used. Thereamong, aluminum foil containing iron is preferable from the viewpoints of having good pinhole resistance and ductility during forming.

The iron content in the aluminum foil (100 mass %) containing iron is preferably in the range of 0.1 to 9.0 mass %, and more preferably in the range of 0.5 to 2.0 mass %. If the iron content is 0.1 mass % or more, the packaging material 1 has good pinhole resistance and ductility. If the iron content is 9.0 mass % or less, the packaging material 1 has good flexibility.

The thickness of the metal foil 11 is preferably in the range of 9 to 200 μm, and more preferably in the range of 15 to 100 μm from the viewpoints of barrier properties, pinhole resistance, processability, and the like.

[Coating Layer]

The coating layer 13 serves to impart heat resistance in the sealing step during the preparation of a power storage device and electrolytic resistance which does not deteriorate the packaging material if in contact with the electrolyte, and inhibits the generation of pinholes that may occur during processing or distribution.

The coating layer 13 is formed with resin, and preferably is directly formed on the first corrosion protection layer 12 formed on the first surface of the metal foil 11 without an adhesive layer. In this case, the coating layer can be formed by coating a coating layer-forming resin material on the first corrosion protection layer. Note that, when using an adhesive layer, the adhesive which is explained with regards to the later-described adhesive layer can be used.

The coating layer 13 includes at least one resin material selected from a group consisting of fluorine resins and amorphous polyester resins. These resins have electrolytic resistance.

As the fluorine resins, mention can be made of tetrafluoro type fluororesins such as polytetrafluoroethylene, tetrafluoroethylene-ethylene copolymer, and tetrafluoroethylene-vinyl copolymer, trifluoro type fluororesins such as polychlorotrifluoroethylene, chlorotrifluoroethylene-ethylene copolymer, and chlorotrifluoroethylene-vinyl copolymer, difluoro type fluororesins such as polyvinylidene fluoride, or, other fluororesins such as tetrafluoroethylene-perfluoroalkyl vinyl ether copolymer, tetrafluoroethylene-hexafluoropropylene copolymer, and polyvinyl fluoride. Among those, tetrafluro type fluororesins are preferable because they have stable structures and thus have good electrolytic resistance, and tetrafluoroethylene-vinyl copolymer imparted with solvent solubility is more preferable. These fluorine resins may be used singly or in combination.

The amorphous polyester resins are preferably solvent-soluble, for example, and include resins obtained by substituting one part such as of ethylene glycol which is a polyalcohol with cyclohexane dimethanol or neopentyl alcohol. From the viewpoint of solvent solubility, more preferable amorphous polyester resin are amorphous polyesters in which one part of ethylene glycol is substituted with cyclohexane dimethanol in polyethylene terephthalate which can be obtained by the dehydration condensation of terephthalic acid and ethylene glycol. The amorphous polyester resins may be used singly or in combination. The coating layer obtained using such an amorphous polyester resin is formed by a coating process as stated above, and a stretching process is not required during formation (unstretched). Therefore, the coating layer obtained using an amorphous polyester resin is clearly different than a conventional stretched polyester film.

The fluorine resin and the amorphous polyester resin are preferably cured with isocyanate. The heat resistance of the coating film (coating layer) can be improved by using isocyanate as a curing agent of these resins, and since the cross-linking structure becomes dense, the film strength of the coating layer increases, and a better formability can be maintained.

As such isocyanates, mention can be made of: aliphatic isocyanates such as methyl isocyanate, hexamethylene diisocyanate, and isophorone diisocyanate; and aromatic isocyanates such as diphenylmethane diisocyanate, and tolylene diisocyanate. These isocyanates can be used singly or in combinations. The isocyanate, preferably includes, among them, aromatic isocyanates which easily improve the strength of the coating film (coating layer), and more preferably include tolylene diisocyanate, in particular. The structure of tolylene diisocyanate is shown below, and has a rigid benzene ring, thus, the strength of the coating film improves. Further, tolylene diisocyanate has a methyl group in position 1, and this group acts to sterically hinder NCO in position 2, thus, the reactivity decreases somewhat, but the reactivity is greater than aliphatic isocyanate. Therefore, when using tolylene diisocyanate, the reaction is completed to some extent at the stage when the coating layer is coated and the solvent is dried, thus, it is difficult for blocking to occur if it is taken up immediately after drying. However, when diphenylmethane diisocyanate is used from among the aromatic isocyanates, there is no group which sterically hinders NCO as shown below, and the reactivity is too great, thus, there is a tendency that the pot life easily decreases and a long-term coating is difficult. When the isocyanate contains tolylene diisocyanate, the content of the isocyanate group due to tolylene diisocyanate in the isocyanate is preferably in the range of 50 to 100 mass %, and more preferably in the range of 60 to 90 mass %, from the viewpoint of more easily expressing the aforementioned advantageous effect.

[Chem.1]

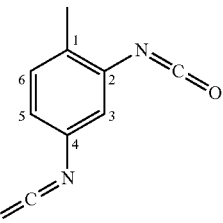
TDI

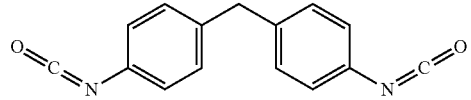
MDI

The thickness of the coating layer 13 is preferably in the range of 3 to 30 μm, and more preferably in the range of 5 to 20 μm from the viewpoint of maintaining electrolytic resistance and formability. When the coating layer 13 is formed directly on the first corrosion protection layer 12 formed on the first surface of the metal foil 11, it is easy to produce a configuration which is thinner than the conventional packaging material by setting the thickness of the coating layer to 20 μm or less.

The coefficient of static friction between surfaces of the coating layer 13 is preferably in the range of 0.10 to 0.60, and more preferably in the range of 0.15 to 0.45, a surface of the coating layer 13 being in contact with the first corrosion protection layer 12. If the coefficient of static friction between surfaces is less than 0.10, there is a risk that the packaging material 1 is easily drawn during the forming process, and wrinkling will occur. However, when the coefficient of static friction is greater than 0.60, there is a tendency that it is difficult for the packaging material 1 to slide smoothly during the forming process, and the formability easily decreases. Methods of adjusting the coefficient of static friction of the coating layer 13 can include a method for changing the coating liquid composition of the coating layer 13, a method of physically changing the surface roughness or the like of the of the coating layer 13, a method of adding an additive to the coating layer 13, and the like. Among these methods, the method of adding an additive to the coating layer 13 is preferable because this method can easily adjust the coefficient of static friction. Note that, the coefficient of static friction is a value based on JIS K 7125 and obtained by measuring surfaces of the coating layers 13, a surface of the coating layer 13 being in contact with the first corrosion protection layer 12.

The additives added to the coating layer 13 can include aliphatic hydrocarbon, higher fatty acid, higher aliphatic alcohol, fatty acid ester, fatty acid amide, fluorine additives, silicone additives, and the like. Specifically, as the aliphatic hydrocarbon, liquid paraffin, polyethylene wax, polypropylene wax, or the like, can be used. As the higher fatty acid, a C12 or more fatty acid, such as stearic acid, can be used. As the higher aliphatic alcohol, a C12 or more aliphatic alcohol, such as stearyl alcohol, can be used. As the fatty acid ester, stearic acid ester, glycerol fatty acid ester, sorbitan fatty acid ester, or the like, can be used. As the fatty acid amide, palmitic acid amide, stearic acid amide, oleic acid amide, erucic acid amide, methylene bis-stearic acid amide, ethylene bis-stearic acid amide, or the like, can be used. As the fluorine additives, perfluoroalkane, perfluoro fatty acid ester, polytetrafluoroethylene, perfluoropolyether, or the like, can be used. As the silicone additives, dimethyl silicone, methylphenyl silicone, alkyl-modified silicone, polyether-modified silicone, amino-modified silicone, or the like, can be used. Of these materials, from the viewpoints of heat resistance and electrolytic resistance, at least one selected from a group consisting of fluorine additives and silicone additives is preferable as the additive. From the viewpoint of electrolytic resistance, polytetrafluoroethylene or perfluoropolyether is specifically preferable as the fluorine additive. As the silicone additive, alkyl-modified silicone or polyether-modified silicone is specifically preferred as it easily improves the coefficient of static friction. The additives added to the coating layer 13 may be used singly or two or more may be mixed together.

The additive may be added in the coating liquid of the coating layer 13, or the additive components may be directly coated onto the surface of the coating layer 13, the surface of the coating layer 13 being opposite to the first corrosion protection layer 12. From the viewpoint of preventing the transferring of the additive during the packaging material manufacturing process or when manufacturing a battery, the additive is preferably added to the coating liquid of the coating layer 13.

The ratio of the additive added to the coating layer 13 is preferably in the range of 0.05 to 1.00 mass %, and is more preferably in the range of 0.10 to 0.50 mass %. If the ratio of the additive is less than 0.05 mass %, there is a risk that a uniform coefficient of static friction cannot be obtained. However, if the ratio of the additive is in excess of 1.00 mass %, there is a risk that other properties such as heat resistance and electrolytic resistance will decrease, and the additive will transfer to other members. If the ratio of the additive is 0.10 mass % or more, a more sufficient sliding property (a low coefficient of static friction) can be obtained when handling the battery, and if 0.50 mass % or less, there is a tendency that a better resistance to the electrolyte can be obtained.

[Corrosion Protection Layer]

The first corrosion protection layer 12 and the second corrosion protection layer 14 (hereinafter, referred to as the "corrosion protection layer") serve to inhibit corrosion of the metal foil 11 due to hydrofluoric acid which is generated by the electrolyte or the reaction between the electrolyte and water. Further, the first and second corrosion protection layers 12 and 14 also serve to increase adhesive force between the metal foil 11 and the adhesive layer 15 (when an adhesive layer is also provided on the first corrosion protection layer 12, between the metal foil 11 and the adhesive layer).

Corrosion protection layers that can be used include coating films formed from coating type or immersion type acid-resistant corrosion prevention treatment agents and layers of metal oxide derived from the metal composing the metal foil 11. Such coating films or layers have a good corrosion prevention effect against acids. Coating films that can be used include, for example, coating films formed by ceria sol treatment with a corrosion prevention treatment agent consisting of cerium oxide, phosphoric acid and a thermosetting resin of any kind, coating films formed by chromate treatment with a corrosion prevention treatment agent consisting of chromate, phosphate, fluoride and a thermosetting resin of any kind, and the like. Note that, the coating film is not limited to the above mentioned coating films, as long as the coating film provides sufficient corrosion resistance to the metal foil 11. For example, coating films formed by phosphate treatment, boehmite treatment, or the like may be used. However, as the layer of metal oxide derived from the metal constituting the metal foil 11, the layer can be used in accordance with the metal foil 11 to be used. For example, when an aluminum foil is used as the metal foil 11, the aluminum oxide layer serves as a corrosion protection layer. These corrosion protection layers may be used singly or in combination of two or more. Further, the first and second corrosion protection layers 12 and 14 may have the same or different configurations. Furthermore, additives such as a silane-based coupling agent may be added to the corrosion protection layer.

The thickness of the corrosion protection layer is preferably in the range of 10 nm-5 μm, and more preferably in the range of 20 to 500 nm in view of the corrosion protective function and the function as an anchor.

[Adhesive Layer]

The adhesive layer 15 serves to bond the metal foil 11 on which the second corrosion protection layer 14 is formed to the sealant layer 16. The packaging material 1 is broadly categorized into thermal lamination configurations and dry lamination configurations according to the adhesive component forming the adhesive layer 15.

As the adhesive component forming the adhesive layer 15 in the thermal lamination configuration, an acid-modified polyolefin resin made by graft-modifying a polyolefin-based resin with acid, such as maleic anhydride, is preferable. Because a polar group is introduced to a part of the non-polar polyolefin resin, the acid-modified polyolefin resin can adhere tightly to both of the sealant layer 16 and the second corrosion protection layer 14, for example, when a non-polar layer formed with a polyolefin resin film, etc., is used as the sealant layer 16 and a polar layer is used as the second corrosion protection layer 14. Further, use of the acid-modified polyolefin resin improves the resistance against the contents such as electrolyte, and if hydrofluoric acid is generated inside the battery, the adhesive forces are easily prevented from being reduced due to deterioration of the adhesive layer 15. Note that, one, or two or more acid-modified polyolefin resins may be used in the adhesive layer 15.

As the polyolefin resin used in the acid-modified polyolefin resin, mention can be made, for example, of: low density polyethylene, medium density polyethylene, high density polyethylene; an ethylene-α olefin copolymer; homo, block, or random polypropylene; a propylene-α olefin copolymer, or the like. Further, a copolymer made by copolymerizing polar molecules such as of acrylic acid or methacrylic acid with the above-described materials; a polymer such as a cross-linked polyolefin; and the like can also be used. As the acid for modifying the polyolefin resin, carboxylic acid, acid anhydride, etc., can be used, and maleic anhydride is preferable.

In the case of the thermal lamination configuration, the adhesive layer 15 can be formed by extruding the adhesive component by an extruder.

In the case of the dry lamination configuration, adhesive components of the adhesive layer 15 that can be used include, for example, two-liquid curing type polyurethane adhesives in which a main resin such as polyester polyol, polyether polyol, and acrylic polyol reacts with an aromatic or aliphatic isocyanate compound having two or more functional groups as the curing agent. However, because the polyurethane adhesive has a coupling portion having high hydrolyzability such as an ester group or a urethane group, the thermal lamination configuration is preferable for uses demanding higher reliability.

The adhesive layer 15 having the dry lamination configuration can be formed by coating the adhesive component onto the second corrosion protection layer 14, followed by drying. If the polyurethane adhesive is used, it is subjected to aging, for example, at 40° C. for 4 or more days after coating to promote the reaction of the hydroxyl group of the main resin with the isocyanate group of the curing agent, and to enable strong adhesion.

The thickness of the adhesive layer 15 is preferably in the range of 2 to 50 μm, and more preferably in the range of 3 to 20 μm, from the viewpoints of adhesiveness, conformability, the processability, and the like.

As stated above, when using an adhesive layer in forming a coating layer 13 on the first corrosion protection layer 12, a two-liquid curing type polyurethane adhesive mentioned associated with the dry lamination configuration of the aforementioned adhesive layer 15 can be used as the adhesive for constructing the adhesive layer. In this case, the thickness of the adhesive layer is preferably in the range of 1 to 10 μm, and more preferably in the range of 3 to 7 μm from the viewpoints of adhesiveness, conformability, the processability, and the like.

[Sealant Layer]

The sealant layer 16 provides sealing properties to the packaging material 1 by heat-sealing. As the sealant layer 16, a resin film made of a polyolefin resin, or a resin film made of an acid-modified polyolefin resin which is obtained by graft-modifying a polyolefin resin using an acid such as maleic anhydride can be used.

Examples of the polyolefin resin include: low-density, medium-density, or high-density polyethylene; an ethylene-α olefin copolymer; homo, block, or random polypropylene; a propylene-α olefin copolymer; and the like. These polyolefin resins may be used singly, or in combination of two or more.

Examples of the acid for modifying a polyolefin include the same acids as those mentioned in describing the adhesive layer 15.

The sealant layer 16 may be a single-layer film or a multilayer film, and may be selected in accordance with the function that is required. For example, in view of imparting moisture-proof properties, a multilayer film in which a resin such as ethylene-cyclic olefin copolymer or polymethylpentene is interposed can be used.

Further, the sealant layer 16 may be formulated with various additives, such as a flame retardant, a slip agent, an anti-blocking agent, an antioxidant, a photostabilizer, and a tackifier.

The thickness of the sealant layer 16 is preferably in the range of 10 to 100 μm, and more preferably in the range of 20 to 60 μm from the viewpoint of preserving insulating properties.

The sealant layer 16 of the packaging material 1, may be layered by dry lamination. However, in view of improving the adhesion properties, the sealant layer 16 of the packaging material 1 is preferably layered on the adhesive layer 15 of an acid-modified polyolefin resin by sandwich-lamination, or a co-extrusion method.

<Preparation Method of the Packaging Material for the Power Storage Device>

The preparation method of the packaging material 1 of the embodiment will be explained below. Specifically, the method including the following Steps (1) to (3) can be used as the preparation method. However, the following contents are only an example and the preparation method of the packaging material 1 is not limited to the following contents.

Step 1: A step of forming a first corrosion protection layer 12 and a second corrosion protection layer 14 on respective surfaces (the first and the second surfaces) of a metal foil 11.

Step 2: A step of using a raw material for a coating layer (resin material) to form a coating layer 13 on the first corrosion protection layer 12 formed on the first surface of the metal foil 11.

Step 3: A step of bonding a sealant layer 16, through an adhesive layer 15, onto a second corrosion protection layer 14 formed on the second surface of the metal foil 11.

(Step 1)

The first corrosion protection layer 12 and the second corrosion protection layer 14 are formed on both surfaces of the metal foil 11, for example, by coating a corrosion prevention treatment agent, following by drying. Examples of the corrosion prevention treatment agent include a corrosion prevention treatment agent for use in ceria sol treatment, and a corrosion prevention treatment agent for use in chromate treatment. The method of coating the corrosion prevention treatment agent is not particularly limited, and examples thereof include gravure coating, reverse coating, roll coating, and bar coating. Alternatively, both surfaces of the metal foil 11 are oxidized to form thereon the layers (the first and second corrosion protection layers 12 and 14) of the metal oxide derived from the metal composing the metal foil 11. Note that, one surface of the metal foil 11 may be treated by a corrosion prevention treatment agent, and the other surface may be oxidized.

(Step 2)

The coating layer-forming raw material (resin material) is coated on a first corrosion protection layer 12 formed on the first surface of the metal foil 11 and dried to form the coating layer 13. The method of coating is not particularly limited, and examples thereof include gravure coating, reverse coating, roll coating, and bar coating. After coating, curing of the coating layer 13 can be accelerated by, for example, 60° C. and 7-day aging treatment.

(Step 3)

The adhesive layer 15 is formed on the second corrosion protection layer 14 in the laminate in which the coating layer 13, the first corrosion protection layer 12, the metal foil 11 and the second corrosion protection layer 14 are laminated in this order. Then, the laminate is bonded to the resin forming the sealant layer 16. In this case, the adhesive layer 15 and the sealant layer 16 can also be laminated on the laminate by co-extrusion. Of both surfaces of the resin film forming the sealant layer 16, one that is bonded to the adhesive layer 15 may be subjected to corona treatment.

The packaging material 1 can be obtained by the above-explained Steps (1) to (3). The order of the steps of the preparation method of the packaging material 1 is not limited to the sequential execution of Steps (1) to (3). For example, Step (2) may be performed after performing Step (3).

<Power Storage Device>

A cell of the power storage device adopting the packaging material 1 can be completed by arranging two packaging materials 1 obtained as stated above in a face-to-face fashion or folding one packaging material 1 such that the folded surfaces are arranged in a face-to-face fashion, arranging inside a power generating element, a tab member serving as a terminal, and the like, and joining the peripheral edges by heat sealing. Namely, the power storage device according to the embodiment includes a container which is formed from the packaging material for the power storage device such that the sealant layer is located on the inside.

More specifically, the power storage device according to the embodiment is provided with a battery element including an electrode, a lead extending from the electrode, and a container sandwiching the lead and accommodating the battery element, wherein the container is formed from the packaging material for the power storage device such that the sealant layer is located on the inside. The container may be obtained by stacking two packaging materials so that the sealant layers face with each other, and heat-sealing the peripheral edges of the stacked packaging materials. Alternatively, the container may be obtained by folding one packaging material and stacking the folded surfaces, and heat-sealing the peripheral edges of the folded surfaces of the packaging material in the same manner. As the power storage device, for example, a secondary battery such as a lithium ion battery, a nickel hydrogen battery or a lead storage battery, or an electrochemical capacitor such as an electric double layer capacitor can be used.

EXAMPLES

The present invention will be explained in detail below by way of examples, but the present invention is not limited by the following descriptions.

<Test 1>
[Materials to be Used]
The materials used in the preparation of the packaging material of the examples and the comparative examples are shown below.
(Coating Layer)

(Coating layer side corrosion protection layer: first corrosion protection layer)
Corrosion protection layer C-1: cerium oxide layer (thickness: 100 nm)
Corrosion protection layer C-2: chromium oxide layer (thickness: 100 nm)
Corrosion protection layer C-3: aluminum oxide layer (thickness: 100 nm)
(Metal Foil)
Metal foil D-1: Soft aluminum foil 8079 (manufactured by Toyo Aluminum K.K, thickness: 30 μm)
(Sealant Layer Side Corrosion Protection Layer: Second Corrosion Protection Layer)
Corrosion protection layer E-1: cerium oxide layer (thickness: 100 nm)
(Adhesive Layer)
Adhesive resin F-1: Polypropylene-based resin that is graft-modified with maleic anhydride (product name "Admer", manufactured by Mitsui Chemicals, Inc., thickness: 20 μm)
(Sealant Layer)
Film G-1: Unstretched polypropylene film of which the surface of the sealant layer side corrosion protection layer E-1 side is subjected to corona treatment (thickness: 40 μm)
(Preparation of the Packaging Material)
The corrosion protection layer E-1 was formed on one surface of the metal foil D-1 by direct gravure coating. Next,

TABLE 1

| No | Main resin | Curing agent 1 | Curing agent 2 | Curing agent blending ratio (NCO ratio) | | NCO/OH | Thickness (μm) |
|---|---|---|---|---|---|---|---|
| | | | | Curing agent 1 | Curing agent 2 | | |
| A-1 | Tetrafluoroethylene-vinyl | TDI | — | 100% | — | 1 | 10 |
| A-2 | copolymer resin | MDI | — | 100% | — | 1 | 10 |
| A-3 | | HDI | — | 100% | — | 1 | 10 |
| A-4 | | TDI | MDI | 80% | 20% | 1 | 10 |
| A-5 | | TDI | MDI | 60% | 40% | 1 | 10 |
| A-6 | | TDI | MDI | 50% | 50% | 1 | 10 |
| A-7 | | TDI | HDI | 80% | 20% | 1 | 10 |
| A-8 | | TDI | HDI | 60% | 40% | 1 | 10 |
| A-9 | | TDI | HDI | 50% | 50% | 1 | 10 |
| A-10 | Chlorotrifluoroethylene-vinyl | TDI | MDI | 80% | 20% | 1 | 10 |
| A-11 | copolymer resin | TDI | HDI | 80% | 20% | 1 | 10 |
| A-12 | Amorphous polyester-based | TDI | — | 100% | — | 1 | 10 |
| A-13 | resin | MDI | — | 100% | — | 1 | 10 |
| A-14 | | HDI | — | 100% | — | 1 | 10 |
| A-15 | | TDI | MDI | 80% | 20% | 1 | 10 |
| A-16 | | TDI | MDI | 60% | 40% | 1 | 10 |
| A-17 | | TDI | MDI | 50% | 50% | 1 | 10 |
| A-18 | | TDI | HDI | 80% | 20% | 1 | 10 |
| A-19 | | TDI | HDI | 60% | 40% | 1 | 10 |
| A-20 | | TDI | HDI | 50% | 50% | 1 | 10 |
| A-21 | Polyurethane-based resin | TDI | — | 100% | — | 1 | 10 |
| A-22 | | MDI | — | 100% | — | 1 | 10 |
| A-23 | | HDI | — | 100% | — | 1 | 10 |
| A-24 | | TDI | MDI | 80% | 20% | 1 | 10 |
| A-25 | | TDI | MDI | 60% | 40% | 1 | 10 |
| A-26 | | TDI | MDI | 50% | 50% | 1 | 10 |
| A-27 | | TDI | HDI | 80% | 20% | 1 | 10 |
| A-28 | | TDI | HDI | 60% | 40% | 1 | 10 |
| A-29 | | TDI | HDI | 50% | 50% | 1 | 10 |
| A-30 | Biaxially stretched Ny film | | | | | | 15 |
| A-31 | Biaxially stretched PET film | | | | | | 12 |

(Coating Layer Side Adhesive Layer)
Adhesive B-1: polyester-urethane adhesive (two-liquid curing type adhesive layer made of polyester polyol and polyisocyanate, thickness: 5 μm)

the corrosion protection layer C-1, C-2 or C-3 was formed by direct gravure coating on the other side of the metal foil D-1 on which the corrosion protection layer E-1 was not formed. In the examples, any of the raw materials A-1

(Example 1) to A-20 (Example 24) for the coating layer was coated onto the surface of each of the metal foils D-1, on which the corrosion protection layer C-1, C-2 or C-3 was formed, thereby forming the coating layer.

However, in the comparative examples, the raw materials A-21 (Comparative example 1) to A-29 (Comparative example 9) for the coating layers were coated onto the surfaces of the respective metal foils D-1, on which the corrosion protection layer C-1 was formed, thereby forming the coating layers. Further, by means of a dry lamination method using the adhesive B-1, the raw materials A-30 (Comparative example 10) and A-31 (Comparative example 11) for the coating layer were bonded to the surfaces of the respective metal foils D-1, on which the corrosion protection layer C-1 was formed.

Next, the adhesive resin F-1 was extruded with an extruder to form the adhesive layer on the corrosion protection layer E-1 side of the obtained laminates of the examples and the comparative examples. After that, the sealant layer was further formed by bonding the film G-1 to each of the laminates by sandwich lamination. The packaging materials of the examples and the comparative examples were produced through the abovementioned processes.

[Evaluations]

The obtained packaging materials were evaluated according to the following methods. The evaluation results are shown in Table 2.

[Evaluation of Formability]

The packaging material obtained in each of the examples was cut to a 150 mm×190 mm blank form, cold-formed while changing the forming depth under an environment of 23° C. room temperature and -35° C. dew point temperature, and the formability was evaluated.

A punch having a shape of 100 mm×150 mm, a punch corner R (RCP) of 1.5 mm, a punch shoulder R (RP) of 0.75 mm, and a die shoulder R (RD) of 0.75 mm was used. The obtained packaging materials were evaluated according to the following criteria.

"A": Deep drawing to a forming depth of 4 mm or more was possible without causing breakage or cracking.

"B": Deep drawing to a forming depth of 3 mm or more and less than 4 mm was possible without causing breakage or cracking.

"C": Breakage or cracking was caused by deep drawing to a forming depth of less than 3 mm.

[Evaluation of Electrolytic Resistance]

An electrolyte (ethylene carbonate/dimethyl carbonate/diethyl carbonate=1:1:1 wt %, $LiPF_6$, 1 M) to which a small amount of water (1500 ppm) was added was added dropwise to the coating layer of the packaging material obtained in each of the examples, and after being left standing for 24 hours, the electrolyte was wiped away with isopropyl alcohol. Then, the appearances of the drop applied portions were evaluated.

"S": The portion where the electrolyte was dropped was unrecognizable, and aging was not observed.

"A": The portion where the electrolyte was dropped was unrecognizable.

"B": An outline was generated in the portion where the electrolyte was dropped, but the portion was not dissolved or damaged.

"C": The portion where the electrolyte was dropped was dissolved or damaged by the electrolyte.

[Evaluation of Heat Resistance]

Two 50 mm×200 mm strip-like samples were cut from the packaging material obtained in each of the examples. Then, the coating layers of the samples in a state of facing each other were sandwiched with heated heat-seal bars for 10 seconds, and evaluated as to whether the coating layers were adhered to each other.

"A": The layers did not adhere to each other even at a heat sealing temperature of 210° C.

"B": The layers did not adhere to each other at a heat sealing temperature of 200° C., but adhered to each other at 210° C.

"C": The layers adhered to each other at a heat sealing temperature of 200° C.

[Evaluation of Blocking Properties]

A raw material for the coating layer was coated onto a metal foil, followed by drying. Immediately after that, a piece of 100 mm×100 mm metal foil was covered onto the coating layer to obtain an evaluation sample. After a preset load was applied by a press machine to the evaluation sample, the sample was heated to 60° C. and stored for 1 week. Then, when the covered metal foil was removed, it was evaluated as to whether the metal foil adhered to the coating layer.

"A": Under a condition of a 10 $kg/cm^2$ load, the covered metal foil did not adhere to the coating layer.

"B": Under a condition of a 5 $kg/cm^2$ load, the covered metal foil did not adhere to the coating layer, but under a condition of a 10 $kg/cm^2$ load, the covered metal foil adhered to the coating layer.

"C": Under a condition of a 5 $kg/cm^2$ load, the covered metal foil adhered to the coating layer.

[Evaluation of Pot Life]

After a main resin, a curing agent and a solvent were mixed (total amount: 100 g) as a treatment agent for making the coating layer, the treatment agent was stirred by a stirrer in a 25° C. 65% RH environment and stored. The time until gelation of the treatment agent from the liquid preparation was measured.

"A": There was no gelation after lapse of 8 hours from the liquid preparation.

"B": There was no gelation after lapse of 5 hours from liquid preparation, but there was gelation after lapse of 8 hours from the liquid preparation.

"C": There was gelation after lapse of 5 hours from the liquid preparation.

TABLE 2

| | Covering layer | Adhesive layer for covering layer | Corrosion protection layer for covering layer | Formability | Electrolyte resistance | Heat resistance | Blocking properties | Pot life |
|---|---|---|---|---|---|---|---|---|
| Ex. 1 | A-1 | — | C-1 | B | A | A | A | A |
| Ex. 2 | A-2 | — | C-1 | B | A | A | A | B |
| Ex. 3 | A-3 | — | C-1 | B | B | B | B | A |
| Ex. 4 | A-4 | — | C-1 | A | A | A | A | A |
| Ex. 5 | — | — | C-2 | B | A | A | A | A |

TABLE 2-continued

|  | Covering layer | Adhesive layer for covering layer | Corrosion protection layer for covering layer | Formability | Electrolyte resistance | Heat resistance | Blocking properties | Pot life |
|---|---|---|---|---|---|---|---|---|
| Ex. 6 |  | — | C-3 | B | B | A | A | A |
| Ex. 7 | A-5 | — | C-1 | A | A | A | A | B |
| Ex. 8 | A-6 | — | C-1 | B | A | A | A | B |
| Ex. 9 | A-7 | — | C-1 | A | A | A | A | A |
| Ex. 10 |  | — | C-2 | B | A | A | A | A |
| Ex. 11 |  | — | C-3 | B | B | A | A | A |
| Ex. 12 | A-8 | — | C-1 | A | A | A | B | A |
| Ex. 13 | A-9 | — | C-1 | B | A | B | B | A |
| Ex. 14 | A-10 | — | C-1 | A | B | A | A | A |
| Ex. 15 | A-11 | — | C-1 | A | B | A | A | A |
| Ex. 16 | A-12 | — | C-1 | B | B | A | A | A |
| Ex. 17 | A-13 | — | C-1 | B | B | A | A | B |
| Ex. 18 | A-14 | — | C-1 | B | B | B | B | A |
| Ex. 19 | A-15 | — | C-1 | A | B | A | A | A |
| Ex. 20 | A-16 | — | C-1 | A | B | A | A | B |
| Ex. 21 | A-17 | — | C-1 | B | B | A | A | B |
| Ex. 22 | A-18 | — | C-1 | A | B | A | A | A |
| Ex. 23 | A-19 | — | C-1 | A | B | A | B | A |
| Ex. 24 | A-20 | — | C-1 | B | B | B | B | A |
| Comp ex. 1 | A-21 | — | C-1 | C | B | B | B | A |
| Comp ex. 2 | A-22 | — | C-1 | C | B | C | B | B |
| Comp ex. 3 | A-23 | — | C-1 | C | C | C | C | A |
| Comp ex. 4 | A-24 | — | C-1 | C | B | C | B | A |
| Comp ex. 5 | A-25 | — | C-1 | C | B | C | B | B |
| Comp ex. 6 | A-26 | — | C-1 | C | B | C | B | B |
| Comp ex. 7 | A-27 | — | C-1 | C | C | C | C | A |
| Comp ex. 8 | A-28 | — | C-1 | C | C | C | C | A |
| Comp ex. 9 | A-29 | — | C-1 | C | C | C | C | A |
| Comp ex. 10 | A-30 | B-1 | C-1 | A | C | B | — | — |
| Comp ex. 11 | A-31 | B-1 | C-1 | C | A | A | — | — |

<Test 2>
[Materials to be Used]
The materials used in the preparation of the packaging material of the examples and the comparative examples are shown below.
(Coating Layer)

TABLE 3

| No. | Main resin | Curing agent (blended NCO ratio) | NCO/OH | Additive | Additive amount (mass %) | Thickness (μm) |
|---|---|---|---|---|---|---|
| A-1' | Tetrafluoroethylene-vinyl copolymer resin | TDI:MDI (6:4) | 1.5 | Polytetrafluoroethylene | 0.05 | 10 |
| A-2' |  |  | 1.5 |  | 0.25 | 10 |
| A-3' |  |  | 1.5 |  | 1.00 | 10 |
| A-4' |  |  | 1.5 | Perfluoropolyether | 0.05 | 10 |
| A-5' |  |  | 1.5 |  | 0.25 | 10 |
| A-6' |  |  | 1.5 |  | 1.00 | 10 |
| A-7' |  |  | 1.5 | Alkyl-modified silicone | 0.05 | 10 |
| A-8' |  |  | 1.5 |  | 0.25 | 10 |
| A-9' |  |  | 1.5 |  | 1.00 | 10 |
| A-10' |  |  | 1.5 | Polyether-modified silicone | 0.05 | 10 |
| A-11' |  |  | 1.5 |  | 0.25 | 10 |
| A-12' |  |  | 1.5 |  | 1.00 | 10 |
| A-13' |  |  | 1.5 | Perfluoroalkane | 0.25 | 10 |
| A-14' |  |  | 1.5 | Dimethyl silicone | 0.25 | 10 |
| A-15' |  |  | 1.5 | Polyethylene wax | 0.25 | 10 |
| A-16' |  |  | 1.5 | Emcic acid amide | 0.25 | 10 |

TABLE 3-continued

| No. | Main resin | Curing agent (blended NCO ratio) | NCO/OH | Additive | Additive amount (mass %) | Thickness (μm) |
|---|---|---|---|---|---|---|
| A-17' | | | 0.5 | — | — | 10 |
| A-18' | Chlorotrifluoroethylene-vinyl | TDI:MDI (6:4) | 1.5 | Polyether-modified silicone | 0.05 | 10 |
| A-19' | copolymer resin | | 1.5 | | 0.25 | 10 |
| A-20' | | | 1.5 | | 1.00 | 10 |
| A-21' | Amorphous polyester-based | TDI:MDI (6:4) | 1.5 | Polytetrafluoroethylene | 0.05 | 10 |
| A-22' | resin | | 1.5 | | 0.25 | 10 |
| A-23' | | | 1.5 | | 1.00 | 10 |
| A-24' | | | 1.5 | Perfluoropolyether | 0.05 | 10 |
| A-25' | | | 1.5 | | 0.25 | 10 |
| A-26' | | | 1.5 | | 1.00 | 10 |
| A-27' | | | 1.5 | Alkyl-modified silicone | 0.05 | 10 |
| A-28' | | | 1.5 | | 0.25 | 10 |
| A-29' | | | 1.5 | | 1.00 | 10 |
| A-30' | | | 1.5 | Polyether-modified silicone | 0.05 | 10 |
| A-31' | | | 1.5 | | 0.25 | 10 |
| A-32' | | | 1.5 | | 1.00 | 10 |
| A-33' | | | 1.5 | Perfluoroalkane | 0.25 | 10 |
| A-34' | | | 1.5 | Dimethyl silicone | 0.25 | 10 |
| A-35' | | | 1.5 | Polyethylene wax | 0.25 | 10 |
| A-36' | | | 1.5 | Emcic acid amide | 0.25 | 10 |
| A-37' | | | 0.5 | — | — | 10 |
| A-38' | Polyurethane-based resin | TDI:MDI (6:4) | 1.5 | Polyethylene wax | 0.05 | 10 |
| A-39' | | | 1.5 | | 0.25 | 10 |
| A-40' | | | 1.5 | | 1.00 | 10 |
| A-41' | Biaxially stretched Nylon film | | | | | 15 |
| A-42' | Biaxially stretched PET film | | | | | 12 |

(Other Configurations)

Test 2 used the adhesive B-1, the corrosion protection layer C-1, the metal foil D-1, the corrosion protection layer E-1, the adhesive resin F-1, and the Film G-1 used in Test 1.

(Preparation of the packaging material)

The corrosion protection layer E-1 was formed by direct gravure coating on one side of the metal foil D-1. Next, the corrosion protection layer C-1 was formed by direct gravure coating on the other side of the metal foil D-1 on which the corrosion protection layer E-1 was not formed. In the examples, one of the raw materials A-1' (Example 1') to A-37' (Example 37') for the coating layer was coated onto the surface of each of the metal foils D-1 on which the corrosion protection layer C-1 was formed, thereby forming the coating layer.

However, in the comparative examples, the raw materials A-38' (Comparative example 1') to A-40' (Comparative example 3') for the coating layer were coated on the surfaces of the respective metal foils D-1 on which the corrosion protection layer C-1 was formed, thereby forming the coating layer. Further, by means of a dry lamination method using the adhesive B-1, the raw materials A-41' (Comparative example 4') and A-42' (Comparative example 5') for the coating layer were bonded to the surfaces of the respective metal foils D-1 on which the corrosion protection layer C-1 was formed on.

Next, the adhesive resin F-1 was extruded with an extruder to form the adhesive layer on the corrosion protection layer E-1 side of the obtained laminates of the examples and the comparative examples. After that, the sealant layer was further formed by bonding the film G-1 to each of the laminates by sandwich lamination. The packaging materials of the examples and the comparative examples were produced through the abovementioned processes.

[Evaluations]

The obtained packaging materials were evaluated according to the following methods. The evaluation results are shown in Table 4. The formability, electrolytic resistance, heat resistance, blocking properties and the pot life were evaluated in the same manner as with Test 1.

[Measurement of Coefficient of Static Friction]

The coefficient of static friction was measured for the surfaces of the coating layer 13 in each of the packaging materials 1 of the examples according to JIS K 7125, a surface of the coating layer 13 being in contact with the first corrosion protection layer 12. The measurement was performed according to the following criteria.

"A": the coefficient of static friction was no less than 0.15 and no more than 0.45.

"B": the coefficient of static friction was no less than 0.10 and less than 0.15, or in excess of 0.45 and no more than 0.60.

TABLE 4

| | Covering layer | Adhesive layer for the covering layer | Coefficient of static friction | Formability | Electrolytic resistance | Heat resistance |
|---|---|---|---|---|---|---|
| Ex. 1' | A-1' | — | B | B | S | A |
| Ex. 2' | A-2' | — | A | A | S | A |
| Ex. 3' | A-3' | — | A | A | A | A |
| Ex. 4' | A-4' | — | B | B | S | A |
| Ex. 5' | A-5' | — | A | A | S | A |

TABLE 4-continued

| | Covering layer | Adhesive layer for the covering layer | Coefficient of static friction | Formability | Electrolytic resistance | Heat resistance |
|---|---|---|---|---|---|---|
| Ex. 6' | A-6' | — | A | A | A | A |
| Ex. 7' | A-7' | — | B | B | S | A |
| Ex. 8' | A-8' | — | A | A | S | A |
| Ex. 9' | A-9' | — | A | A | A | A |
| Ex. 10' | A-10' | — | B | B | S | A |
| Ex. 11' | A-11' | — | A | A | S | A |
| Ex. 12' | A-12' | — | A | A | A | A |
| Ex. 13' | A-13' | — | B | B | A | A |
| Ex. 14' | A-14' | — | B | B | A | A |
| Ex. 15' | A-15' | — | B | B | B | B |
| Ex. 16' | A-16' | — | B | B | B | A |
| Ex. 17' | A-17' | — | B | B | B | A |
| Ex. 18' | A-18' | — | B | B | S | A |
| Ex. 19' | A-19' | — | A | A | S | A |
| Ex. 20' | A-20' | — | A | A | A | A |
| Ex. 21' | A-21' | — | B | B | S | A |
| Ex. 22' | A-22' | — | A | A | S | A |
| Ex. 23' | A-23' | — | A | A | A | A |
| Ex. 24' | A-24' | — | B | B | S | A |
| Ex. 25' | A-25' | — | A | A | S | A |
| Ex. 26' | A-26' | — | A | A | A | A |
| Ex. 27' | A-27' | — | B | B | S | A |
| Ex. 28' | A-28' | — | A | A | S | A |
| Ex. 29' | A-29' | — | A | A | A | A |
| Ex. 30' | A-30' | — | B | B | S | A |
| Ex. 31' | A-31' | — | A | A | S | A |
| Ex. 32' | A-32' | — | A | A | A | A |
| Ex. 33' | A-33' | — | B | B | A | A |
| Ex. 34' | A-34' | — | B | B | A | A |
| Ex. 35' | A-35' | — | B | B | B | B |
| Ex. 36' | A-36' | — | B | B | B | A |
| Ex. 37' | A-37' | — | B | B | B | B |
| Comp ex. 1' | A-41' | — | B | C | B | C |
| Comp ex. 2' | A-42' | — | A | C | B | C |
| Comp ex. 3' | A-43' | — | A | B | B | C |
| Comp ex. 4' | A-44' | B-1 | A | A | C | B |
| Comp ex. 5' | A-45' | B-1 | A | C | A | A |

While not described in the table, the packaging materials of the examples of Test 2 were also evaluated to be A or B regarding the blocking properties and the pot life, similarly to the packaging materials of the examples of Test 1.

The examples having the configuration of the present invention could provide a packaging material for a power storage device which can maintain sufficient formability, and having electrolytic resistance which is not altered if in contact with the electrolyte, and very good heat resistance.

REFERENCE SIGNS LIST

1 . . . packaging material for power storage device (packaging material)
11 . . . metal foil
12 . . . first corrosion protection layer
13 . . . coating layer
14 . . . second corrosion protection layer
15 . . . adhesive layer
16 . . . sealant layer

What is claimed is:
1. A packaging material for a power storage device, comprising:
in order from a first surface of a metal foil, a first corrosion protection layer and a coating layer; and
in order from a second surface of the metal foil, a second corrosion protection layer, an adhesive layer, and a sealant layer, and,
wherein the coating layer contains at least one resin selected from the group consisting of fluorine resins and amorphous polyester resins,
and wherein a) the metal foil is in direct contact with the first corrosion protection layer without an adhesive layer in between and b) the first corrosion protection layer in is in direct contact with the coating layer.
2. The packaging material for a power storage device of claim 1, wherein the thickness of the coating layer is in a range of 3 to 30 μm.
3. The packaging material for a power storage device of claim 1, wherein the isocyanate includes tolylene diisocyanate.
4. The packaging material for a power storage device of claim 1, wherein a coefficient of static friction between surfaces of the coating layer is in a range of 0.10 to 0.60, a surface of the coating layer being in contact with the first corrosion protection layer.
5. The packaging material for a power storage device of claim 1, wherein the coating layer further contains at least one additive selected from a group consisting of fluorine additives and silicone additives.
6. The packaging material for a power storage device of claim 5, wherein the fluorine additives are polytetrafluoroethylenes or perfluoropolyethers, and the silicone additives are alkyl-modified silicones or polyether-modified silicones.
7. The packaging material for a power storage device of claim 5, wherein the content of the additives is in a range of 0.05 to 1.00 mass %.

8. A power storage device comprising a container formed from the packaging material for a power storage device according to claim 1 so that the sealant layer is located on the inside.

9. The packaging material of claim 1, wherein the coating layer contains at least one fluorine resin.

10. The packaging material of claim 1, wherein the coating layer contains at least one amorphous polyester resin.

* * * * *